(12) United States Patent
Wilenski et al.

(10) Patent No.: US 8,997,416 B2
(45) Date of Patent: Apr. 7, 2015

(54) OPAQUE FIBER REINFORCEMENT OF COMPOSITES

(75) Inventors: Mark S. Wilenski, Seattle, WA (US);
Alan M. Markus, Lake Forest, CA (US); Larry A. Godby, North Hills, CA (US)

(73) Assignee: The Boeing Company, Chicago, IL (US)

( * ) Notice: Subject to any disclaimer, the term of this patent is extended or adjusted under 35 U.S.C. 154(b) by 703 days.

(21) Appl. No.: 12/173,776

(22) Filed: Jul. 15, 2008

(65) Prior Publication Data
US 2010/0011702 A1    Jan. 21, 2010

(51) Int. Cl.
| | |
|---|---|
| *E04C 1/00* | (2006.01) |
| *B32B 17/04* | (2006.01) |
| *B29C 70/30* | (2006.01) |
| *B32B 17/06* | (2006.01) |
| *B64C 1/14* | (2006.01) |
| *B29L 31/00* | (2006.01) |

(52) U.S. Cl.
CPC ............... *B32B 17/04* (2013.01); *B29C 70/30* (2013.01); *B32B 17/067* (2013.01); *B64C 1/1492* (2013.01); *B29K 2995/0025* (2013.01); *B29K 2995/0026* (2013.01); *B29K 2995/0089* (2013.01); *B29L 2031/778* (2013.01); *B32B 2605/18* (2013.01); *Y02T 50/433* (2013.01); *Y02T 50/43* (2013.01)

(58) Field of Classification Search
CPC .................. B32B 17/10366; B32B 2605/18; B32B 5/28; B29K 2995/0026; E06B 3/6604; E06B 3/221; C08J 5/24
USPC ......... 52/309.1, 308, 309.13, 309.16, 786.11, 52/788.1
See application file for complete search history.

(56) References Cited

U.S. PATENT DOCUMENTS

| | | | | |
|---|---|---|---|---|
| 2,659,686 | A | * | 11/1953 | Watkins ........................... 52/208 |
| 2,696,451 | A | * | 12/1954 | Snyder ............................. 428/83 |
| 4,997,687 | A | * | 3/1991 | Carter .............................. 428/34 |
| 5,039,566 | A | * | 8/1991 | Skubic et al. .................. 428/113 |
| 5,040,352 | A | * | 8/1991 | Oberlander et al. ........ 52/786.11 |
| 5,160,782 | A | * | 11/1992 | Hickman ......................... 442/18 |
| 5,219,630 | A | * | 6/1993 | Hickman ......................... 428/38 |
| 5,372,866 | A | * | 12/1994 | Oberlander et al. .......... 428/110 |
| 5,665,450 | A | | 9/1997 | Day et al. |
| 5,794,403 | A | * | 8/1998 | Oberlander et al. ........ 52/786.11 |
| 6,177,156 | B1 | * | 1/2001 | Glover et al. .................... 428/34 |
| 6,378,931 | B1 | * | 4/2002 | Kolluri et al. ............ 296/146.15 |
| 7,028,950 | B2 | * | 4/2006 | Salmon et al. .............. 244/129.3 |
| 7,968,170 | B2 | * | 6/2011 | Albers et al. ................... 428/138 |
| 2005/0053765 | A1 | | 3/2005 | Albers et al. |
| 2005/0082432 | A1 | | 4/2005 | Nordman |
| 2006/0070348 | A1 | * | 4/2006 | Choate et al. .............. 52/786.11 |
| 2007/0034743 | A1 | * | 2/2007 | Albers et al. ............... 244/129.3 |
| 2010/0024692 | A1 | * | 2/2010 | Bar ................................. 109/64 |

* cited by examiner

*Primary Examiner* — Mark Wendell
(74) *Attorney, Agent, or Firm* — Yee & Associates, P.C.

(57) ABSTRACT

A composite material includes a polymeric matrix, at least one transparent region including a plurality of optically clear elements provided in the polymeric matrix and at least one opaque region including a plurality of opaque reinforcing elements provided in the polymeric matrix substantially parallel and adjacent to the at least one transparent region. A structural window and a method for reinforcing a composite material are also disclosed.

18 Claims, 2 Drawing Sheets

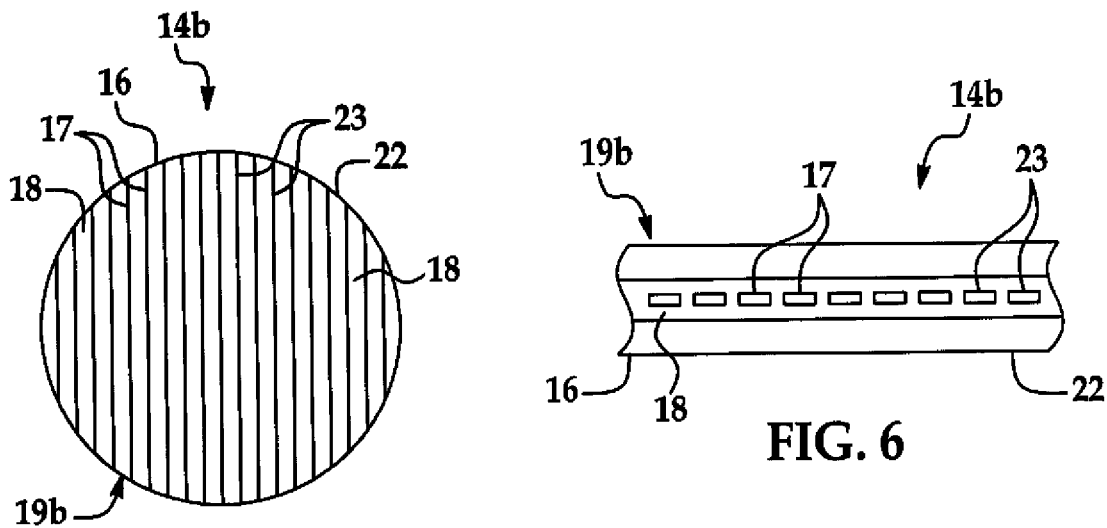
FIG. 5
FIG. 6
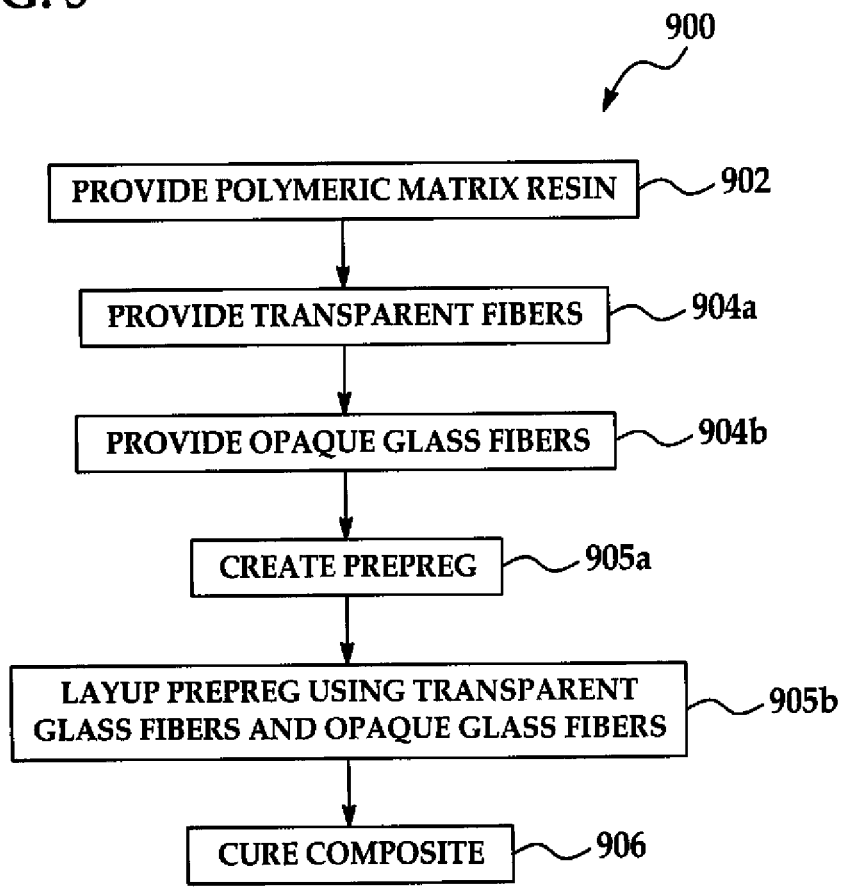
FIG. 7

OPAQUE FIBER REINFORCEMENT OF COMPOSITES

FIELD OF THE INVENTION

The disclosure relates to composites. More particularly, the disclosure relates to composites having an opaque region or regions of opaque elements adjacent to a transparent region or regions of optically clear elements to reinforce the structural or ballistic performance of the composites.

BACKGROUND OF THE INVENTION

The strength and stiffness of optically clear composite materials may be a function of the quantity, strength, and type of the glass fiber in the materials. The degree of optical distortion may be a function of the quantity of glass in the material. Ultimately, the quantity of glass that is acceptable for many applications may be limited by the optical performance of the system. Therefore, an alternate method of improving the strength and stiffness of optically clear composite materials may be desirable.

SUMMARY OF THE INVENTION

The disclosure is generally directed to a reinforced composite material. An illustrative embodiment of the reinforced composite material includes a polymeric matrix, at least one transparent region including a plurality of optically clear elements provided in the polymeric matrix and at least one opaque region including one or more opaque reinforcing elements provided in the polymeric matrix generally adjacent to the at least one transparent region.

The disclosure is further generally directed to a structural window. An illustrative embodiment of the structural window includes a composite material having a window border and comprising a polymeric matrix, at least one transparent region including a plurality of optically clear elements provided in the polymeric matrix and at least one opaque region including a plurality of opaque reinforcing elements provided in the polymeric matrix generally adjacent to the at least one transparent region.

The disclosure is further generally directed to a method for reinforcing a composite material. An illustrative embodiment of the method includes providing a polymeric matrix resin, providing at least one transparent region including a plurality of optically clear elements in the polymeric matrix resin, providing at least one opaque region including a plurality of opaque reinforcing elements in the polymeric matrix resin and curing the polymeric matrix resin.

BRIEF DESCRIPTION OF THE ILLUSTRATIONS

FIG. 5 is an enlarged sectional view, taken along section line 5 in FIG. 4, with reinforcing opaque elements in the opaque region oriented in generally parallel relationship with respect to optically clear elements in the transparent region of the composite material.

FIG. 6 is a cross-sectional view of a portion of the structural window shown in FIG. 4, with the optically clear elements in the transparent region and the opaque reinforcing elements in the opaque region embedded in a polymeric matrix of the composite material.

FIG. 7 is a flow diagram illustrating an illustrative method for reinforcing a composite material.

DETAILED DESCRIPTION OF THE PREFERRED EMBODIMENT

The disclosure is generally directed to composite materials including at least one opaque region having opaque elements such as opaque fibers and/or ribbons, for example and without limitation, embedded in a polymeric matrix in discrete, designed locations to improve performance of the composite materials. The opaque region or regions may be generally adjacent to a transparent region or regions having optically clear elements such as glass fibers and/or ribbons, for example and without limitation. The reinforcing opaque elements of the opaque region or regions may be oriented in any desired orientation or orientations with respect to the optically clear elements of the transparent region or regions.

Figure 1:
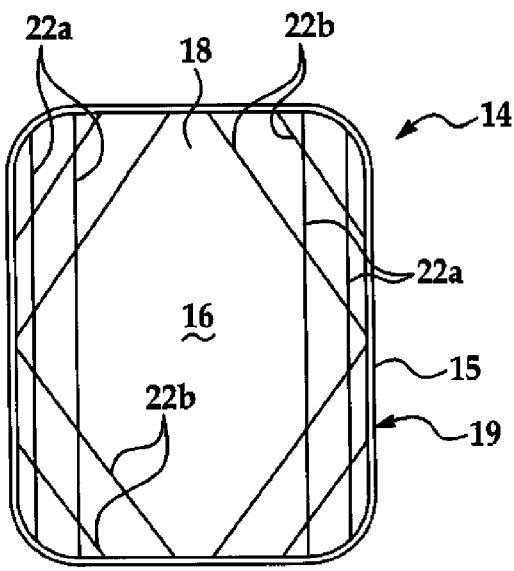
FIG. 1 is a front view of a composite material in the form of a structural window, illustrating an illustrative reinforcing opaque region pattern in the composite material.
Figure 2:
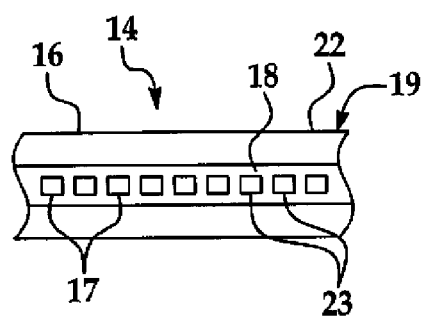
FIG. 2 is a cross-sectional view of a transparent region and an adjacent opaque region of the structural window.
Figure 3:
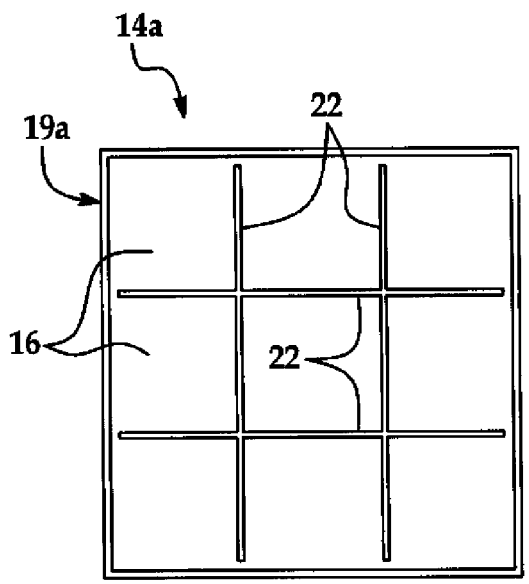
FIG. 3 is a front view of another illustrative embodiment of the composite material in the form of a structural window, illustrating an alternative, grid-shaped illustrative reinforcing opaque region pattern in the composite material.

Referring initially to FIGS. 1-3, a structural window 14 which includes a composite material 19 is shown in FIGS. 1 and 2. The structural window 14 may have a window border 15 of any desired size and shape depending on the application. The composite material 19 may include a polymeric matrix 18 which may be optically transparent. The polymeric matrix 18 may be any type of polymer which is suitable for fabrication of transparent or other materials, including but not limited to epoxy; polymethyl methacrylate (acrylic); polyurethane, polycarbonate; and transparent polymers.

One or multiple opaque regions 22, each having opaque reinforcing elements 23 (FIG. 2) embedded in the polymeric matrix 18, may be provided at selected locations of the structural window 14 where reinforcement of the composite material 19 is desired. Each opaque reinforcing element 23 may be an opaque fiber(s) or ribbon(s), for example and without limitation, and may be carbon (graphite), organic fibers such as SPECTRA® or KEVLAR®, metal fibers, boron, silicon carbide (SiC), etc., polyimide or other high-strength fiber material. The choice of material for the opaque reinforcing elements 23 may be dependent upon the desired property improvement. For example, an opaque reinforcing element 23 of stiff graphite fiber may be used to improve stiffness performance of the composite material 19, whereas an opaque reinforcing element 23 of high-strain organic fiber may be used for ballistics purposes. As shown in FIG. 2, optically clear elements 17 may be embedded in the polymeric matrix 18 at the transparent region or regions 16 of the composite material 19. The optically clear elements 17 may be any suitable optically clear material such as glass fibers and/or glass ribbons and/or may be optically clear polymer fibers and/or ceramic fibers, for example and without limitation. Depending on the desired properties (such as improved toughness or stiffness, for example) of the composite material 19, the polymeric matrix 18 has resin which may be the same in the transparent region or regions 16 and the opaque region or regions 22 or may be different in the transparent region or regions 16 and the opaque region or regions 22. Furthermore, each transparent region 16 may include multiple transparent layers which may vary in orientation to impart the desired structural, ballistic or other properties to the composite material 19.

The opaque regions 22 with opaque reinforcing elements 23 may be oriented and distributed throughout the polymeric matrix 18 in any suitable pattern. In some embodiments of the structural window 14, shown in FIG. 1, one or multiple longitudinal opaque regions 22a may extend in generally parallel relationship and multiple angled opaque regions 22b may extend in generally angled relationship with respect to a longitudinal axis of the structural window 14. The longitudinal opaque regions 22a and angled opaque regions 22b may frame one or multiple optically-clear transparent regions 16 of the structural window 14. In other embodiments, such as the structural window 14a shown in FIG. 3, the opaque regions 22 may be oriented in intersecting rows and columns in the composite material 19a to form a grid pattern having multiple, adjacent, optically-clear transparent regions 16.

Figure 4:
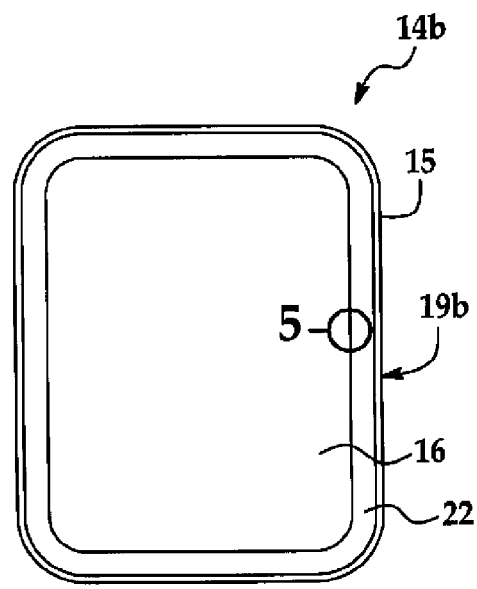
FIG. 4 is a front view of a structural window which includes a composite material having a central transparent region and an outer opaque region.

Referring next to FIGS. 4-6, an alternative structural window 14b may include a composite material 19b having a central transparent region 16 and a surrounding opaque region 22 which is generally adjacent to the central transparent region 16. Alternatively, in some embodiments the transparent region 16 may be located outwardly of the opaque region 22 of the structural window 14b. The number and locations of the transparent region 16 and the opaque region 22 throughout the composite material 19b may vary depending on the desired application of the structural window 19b.

Referring next to FIG. 7, a flow diagram 900 which illustrates an alternative illustrative method for reinforcing an optically transparent composite material is shown. In block 902, a polymeric matrix resin is provided. In block 904a, transparent glass fibers are provided. In block 904b, opaque fibers are provided. Blocks 904a and 904b may be carried out simultaneously. In block 905a, a prepreg is created. In block 905b, the prepreg is laid up using the transparent glass fibers provided in block 904a and the opaque fibers provided in block 904b. In block 906, the resulting composite is cured.

While not so limited, the transparent composite article is suitable for use as a component of a window assembly or other transparent device. Window assembly, as used herein, includes a window and components associated with the window, including the window, frames, mounting devices, or other associated equipment or devices. For example, the transparent composite article may be assembled into a window assembly for an aircraft or a transparent portion of an automobile, armored vehicle (e.g., a personnel carrier or transport) or boat (e.g., a glass-bottomed boat). In addition, the transparent composite article may be assembled into a window assembly for a stationary structure, such as a skyscraper or other architectural structure. Further still, in addition to window applications, the transparent composite article is suitable for use with riot gear or other personal protection, such as face shields or arm shields, wherein it is desirable to permit viewing through a ballistic-resistant material.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A composite material in a structural window, comprising:
    an optically transparent polymeric matrix;
    a plurality of optically clear elements defining at least one transparent region positioned in a center of the window, the plurality of optically clear elements embedded in and surrounded by said polymeric matrix, the plurality of optically clear elements substantially aligned adjacent each other in a plane, each of said optically clear elements comprising optically transparent material;
    a plurality of opaque reinforcing elements defining at least one opaque region, the plurality of opaque reinforcing elements embedded in and surrounded by said polymeric matrix, a first section of the plurality of opaque reinforcing elements aligned substantially parallel and adjacent each other in the plane and substantially parallel and adjacent to the plurality of optically clear elements in a first side region and a second side region framing the center of the window, a second section of the plurality of opaque reinforcing elements in the first side region and positioned at an angle with respect to the first section, and a third section of the plurality of opaque reinforcing elements in the second side region and positioned at an angle with respect to the first section, said opaque reinforcing elements reinforcing a structural or ballistic performance of the window, and
    the plurality of optically clear elements and the plurality of opaque reinforcing elements positioned such that the transparent region substantially excludes the opaque reinforcing elements in the center of the window and the opaque region substantially excludes the optically clear elements in the first side region and the second side region and the plurality of optically clear elements and the plurality of opaque reinforcing elements further configured in a nonsuperimposed configuration with respect to each other in the center of the window, the first side region, and the second side region, and
    wherein the plurality of optically clear elements and the plurality of opaque elements are configured so as to provide reinforcement in a structural window.

2. The composite material of claim 1 wherein said plurality of opaque reinforcing elements is selected from the group consisting of carbon fibers, organic fibers, metal fibers, boron fibers, silicon carbide fibers and polyimide fibers.

3. The composite material of claim 1 wherein said plurality of optically clear elements is selected from the group consisting of glass fibers and glass ribbons.

4. The composite material of claim 1 wherein said polymeric matrix comprises resin of a same material in said at least one transparent region and said at least one opaque region.

5. The composite material of claim 1 wherein said polymeric matrix comprises resin of different materials in said at least one transparent region and said at least one opaque region.

6. The composite material of claim 1 wherein said polymeric matrix comprises at least one of epoxy, polymethyl methacrylate (acrylic), polyurethane, and polycarbonate.

7. The composite material of claim 1 where each transparent region comprises multiple transparent layers, each layer having a selected orientation different with respect to at least one other layer.

8. The composite material of claim 1, wherein the plurality of optically clear elements are positioned substantially in a plane and the plurality of opaque reinforcing elements are positioned substantially in the plane, and further comprising said opaque region adjacent a border of said composite material and substantially surrounding said transparent region.

9. The composite material of claim 1, wherein the plurality of optically clear elements and the plurality of opaque reinforcing elements are substantially aligned along a common longitudinal axis.

10. A structural window, comprising:
a composite material having a window border and comprising:
an optically transparent polymeric matrix;
a plurality of optically clear elements defining at least one transparent region, the plurality of optically clear elements embedded in and surrounded by said polymeric matrix, each of said optically clear elements comprising optically transparent material, the plurality of optically clear elements aligned substantially parallel and adjacent each other in a plane; and
a plurality of opaque reinforcing elements defining at least one opaque region, the plurality of opaque reinforcing elements embedded in and surrounded by said polymeric matrix, the plurality of opaque reinforcing elements aligned substantially parallel and adjacent each other in the plane and also positioned substantially parallel and adjacent to the plurality of optically clear elements in a first side region and a second side region framing the center of the window, said opaque reinforcing elements reinforcing a structural or ballistic performance, said at least one opaque region adjacent said border and surrounding said transparent region, and
the plurality of optically clear elements and the plurality of opaque reinforcing elements positioned such that the transparent region substantially excludes opaque reinforcing elements in the center of the window and the opaque region substantially excludes optically clear elements in the first side region and the second side region of the window, and the window having adjacent positioning of the plurality of optically clear elements and the plurality of opaque reinforcing elements in a nonsuperimposed configuration in the center, the first side region, and the second side region, and
wherein the plurality of optically clear elements and the plurality of opaque elements are configured so as to provide reinforcement in a structural window.

11. The structural window of claim 10 wherein said plurality of opaque reinforcing elements is selected from the group consisting of carbon fibers, organic fibers, metal fibers, boron fibers, silicon carbide fibers and polyimide fibers.

12. The structural window of claim 10 wherein said plurality of optically clear elements comprises at least one of a plurality of glass fibers and ribbons.

13. The structural window of claim 10 wherein said polymeric matrix comprises resin of a same material in said at least one transparent region and said at least one opaque region.

14. The structural window of claim 10 wherein said polymeric matrix comprises resin of different materials in said at least one transparent region and said at least one opaque region.

15. The structural window of claim 10 wherein said polymeric matrix comprises at least one of epoxy, polymethyl methacrylate (acrylic), polyurethane, and polycarbonate.

16. The structural window of claim 10, wherein said structural window comprises an aircraft window.

17. The structural window of claim 10, wherein the plurality of optically clear elements and the plurality of opaque reinforcing elements are substantially aligned along a longitudinal axis of the window.

18. A composite structural window in an aircraft, comprising:
a composite material having comprising a structural window with an opaque border comprising:
an optically transparent polymeric matrix;
a plurality of optically clear elements defining a transparent region positioned substantially in a center of the window, the plurality of optically clear elements embedded in and surrounded by the polymeric matrix, each of the optically clear elements comprising optically transparent material, the plurality of optically clear elements aligned substantially parallel and adjacent each other in a plane; and
a plurality of opaque reinforcing elements defining an opaque region, the opaque region positioned substantially in a border area of the window and surrounding the center of the window, the plurality of opaque reinforcing elements embedded in and surrounded by the polymeric matrix, the plurality of opaque reinforcing elements aligned substantially parallel and adjacent each other-in the plane and also positioned substantially parallel and adjacent to the plurality of optically clear elements, said opaque reinforcing elements reinforcing a structural or ballistic performance, said at least one opaque region adjacent said border and surrounding said transparent region, and
the plurality of optically clear elements and the plurality of opaque reinforcing elements positioned such that the transparent region positioned in the center of the window substantially excludes opaque reinforcing elements, and the opaque region in a first side area and a second side area of the border area substantially excludes optically clear elements, wherein the first side area and the second side area have the same alignment as the optically clear elements and the opaque reinforcing elements, the plurality of optically clear elements and the plurality of opaque reinforcing elements having a nonsuperimposed configuration in the center of the window, the first side area, and the second side area; and
wherein the plurality of optically clear elements and the plurality of opaque elements are configured so as to provide reinforcement in the structural window.

* * * * *